W. S. MENDEN.
GATE FOR VEHICLES AND MEANS FOR MOUNTING SAME.
APPLICATION FILED DEC. 5, 1914.
1,142,264.
Patented June 8, 1915.
3 SHEETS—SHEET 1.
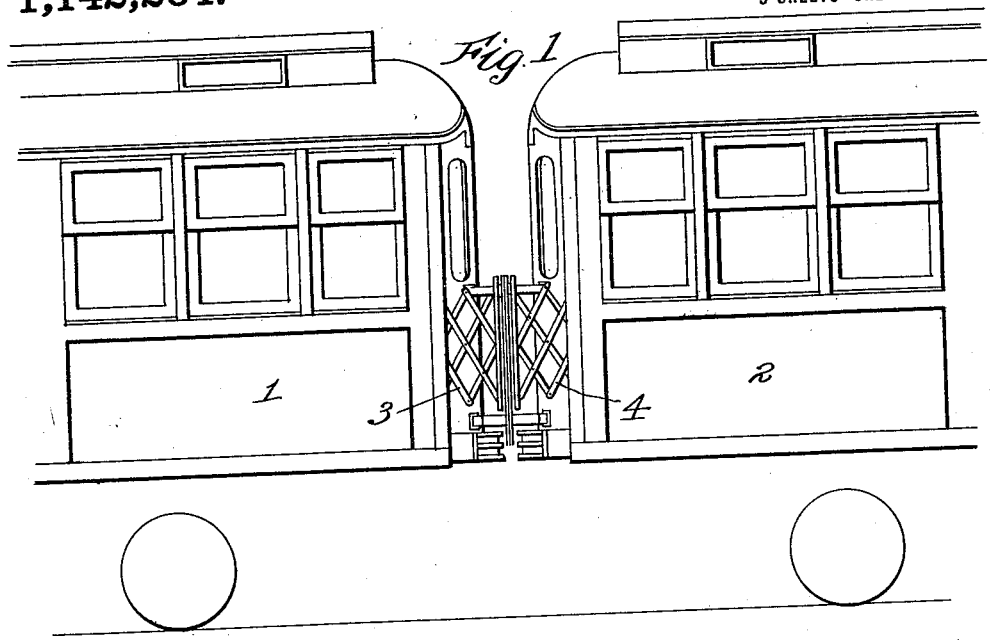
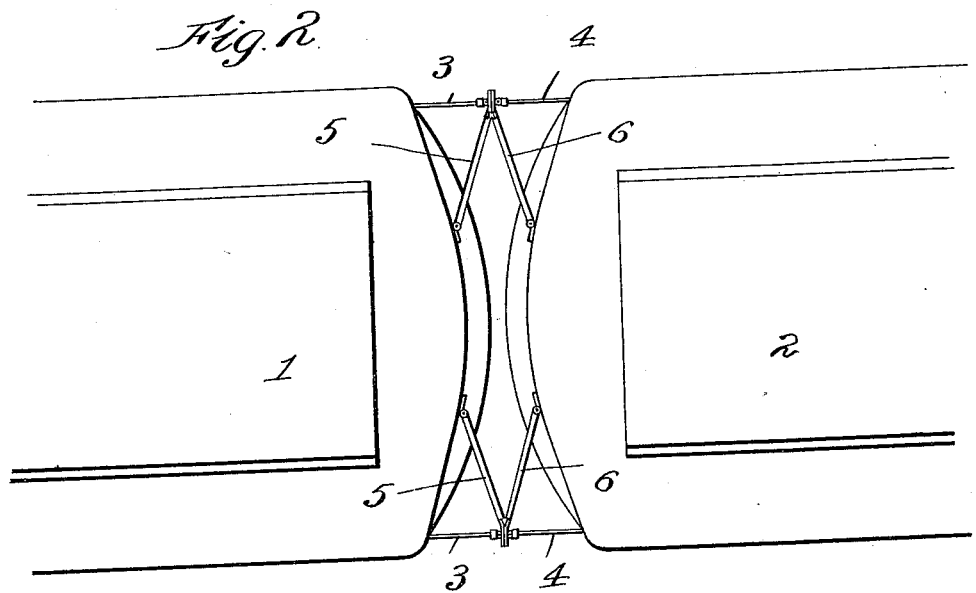
Witnesses:
Inventor

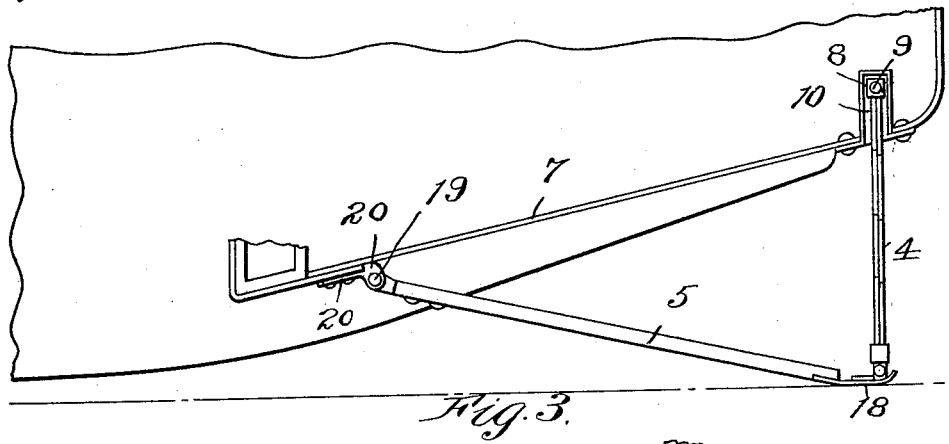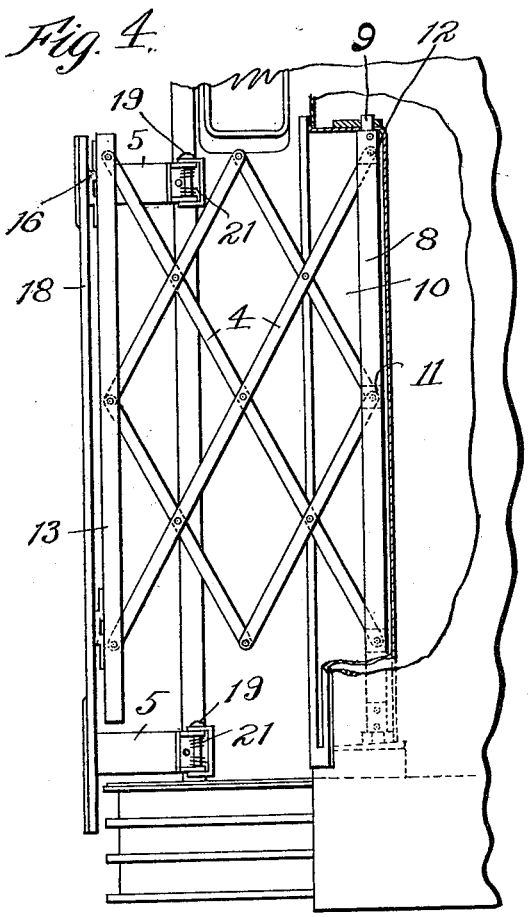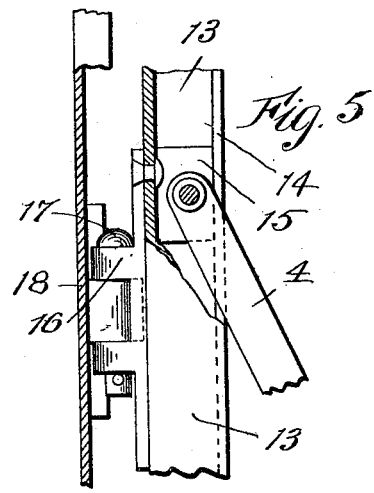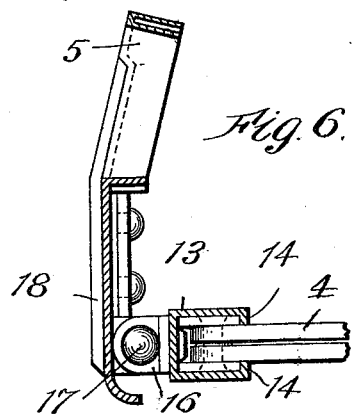

W. S. MENDEN.
GATE FOR VEHICLES AND MEANS FOR MOUNTING SAME.
APPLICATION FILED DEC. 5, 1914.

1,142,264.

Patented June 8, 1915.
3 SHEETS—SHEET 3.

Witnesses:
Wm. A. Courtland
Geza A. Semon

Inventor
William S. Menden
By his Attorney

UNITED STATES PATENT OFFICE.

WILLIAM S. MENDEN, OF BROOKLYN, NEW YORK, ASSIGNOR TO MEGOSIN COMPANY, INC., A CORPORATION OF NEW YORK.

GATE FOR VEHICLES AND MEANS FOR MOUNTING SAME.

1,142,264.  Specification of Letters Patent.  Patented June 8, 1915.

Application filed December 5, 1914. Serial No. 875,664.

*To all whom it may concern:*

Be it known that I, WILLIAM S. MENDEN, a citizen of the United States, and a resident of the borough of Brooklyn, city and State of New York, have invented certain new and useful Improvements in Gates for Vehicles and Means for Mounting Same, of which the following is a full and clear specification.

This invention relates to the provision of suitable means for barricading the spaces between the adjoining ends of vehicles arranged in trains and has for its primary object to provide improved means for mounting said gates in approximate alinement with the side walls of the vehicles so that crowding passengers will be positively excluded from falling between the vehicles and thus receiving injuries.

The invention is peculiarly valuable in connection with the passenger transportation systems in which the platforms and floors of the vehicles are on a level with the platforms from which the passengers enter the vehicles.

Other objects of construction and arrangement will appear in the specification and be pointed out in the appended claims, reference being had to the accompanying drawings, in which the invention is exemplified.

Figure 7:
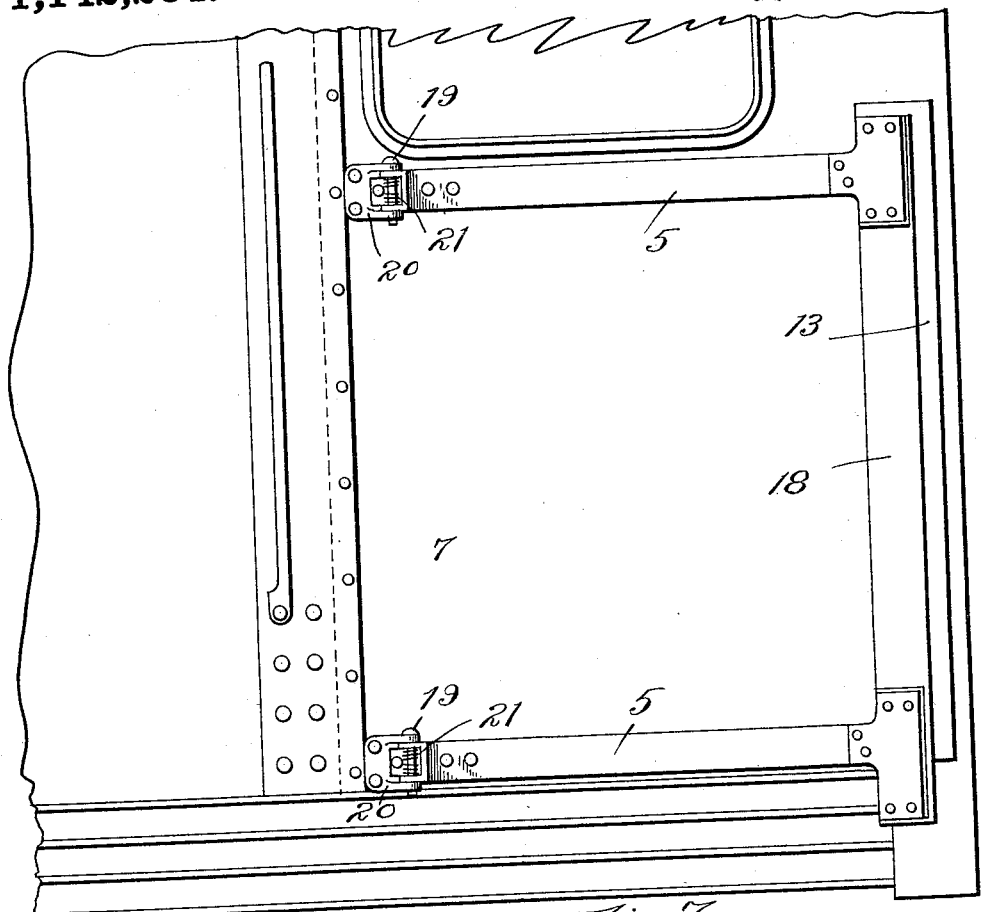
Figure 8:
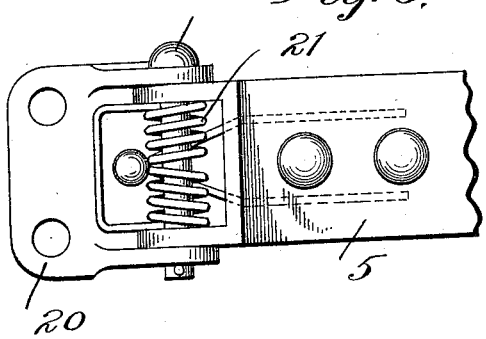
Figure 9:
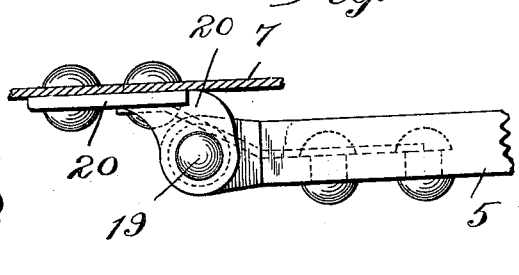

In the drawings, Figure 1 is a fragmentary side elevation of the adjacent ends of two cars in train; Fig. 2 is a top plan view of the same. Fig. 3 is a horizontal fragmentary section on an enlarged scale, of one of the cars, showing the barrier in top plan view. Fig. 4 is a side elevation of the same, parts being broken away and parts being shown in section. Fig. 5 is a fragmentary side elevation on an enlarged scale of a portion of the barrier, parts being broken away and parts being shown in section. Fig. 6 is a horizontal section of the same. Fig. 7 is an end elevation of the barrier on an enlarged scale. Fig. 8 is a fragmentary detail view, showing resilient means for extending the barrier. Fig. 9 is a top plan view of the same.

Referring more particularly to the drawings, vehicles 1 and 2 are provided with barrier sections 3 and 4 which as shown in Fig. 2 are normally held in abutment by means of struts 5 and 6, on either side of the train. Sections 3 and 4 constitute a barrier arranged in approximately the same plane with the lateral walls of the vehicles for the purpose of preventing passengers from entering or being forced into the space between the vehicles, thus exposing them to serious injury.

In the preferred embodiment of my invention, the adjacent ends of the vehicles are provided with end walls 7 which may, if desired, have door openings for providing a throughway extending throughout the length of the train. Referring now to Figs. 3 to 6, inclusive, it will be seen that each of the barrier sections is carried by a post 8 which is journaled on a vertical axis 9, disposed within a recess or pocket 10, provided adjacent to each outer corner of the car. The post 8 is preferably made of U-shaped or channeled cross section, the legs of the U being provided with flanges which serve to retain the sliding blocks 11 carried by different members of the sections or gates 3 and 4, said gates being preferably constructed in the form of lazy tongs. A pivotal connection 12 serves to secure the upper end of each gate to the post 8. As shown best in Fig. 6, the free edge of each of the gates carries a channeled bar 13 with inturned flanges 14, which retain the slide blocks 15 in position, said blocks 15 being riveted to the outer ends of the diagonal members of the gate 4. Secured to the bar 13 are a plurality of brackets 16 pivotally connected by bolts or rivets 17 to an abutment strip 18. As shown best in Fig. 3, each of the abutment strips 18 is connected to one of the struts 5 or 6, the other ends of said struts being pivotally connected at 19 with brackets 20, each of which is rigidly secured to the end wall 7 of the vehicle.

By referring to Figs. 8 and 9, it will be seen that each of the brackets 20 is riveted to the end wall 7, the pivot 19 being carried by spaced flanges on said bracket 20. Interposed between the spaced flanges of said bracket are corresponding spaced flanges on the end of the strut 5. Resilient means tending to force the struts or supports away from the end wall 7 of the vehicles, are preferably provided by means of helical spring 21, which is coiled in oppositely wound branches on the pin 19 in such manner as to have the loop end thereof bearing against the flange of the bracket 20, while the branch ends thereof bear against the strut 5. The tension of the spring 21 tends to force the arm 5 away from the wall 7, according to Fig. 9. As shown in Fig. 7, the abutment strip 18, together with the struts 5, constitute a swinging frame which is pivotally connected to the wall 7 of the vehicle. As shown in Fig. 1, the vehicles are preferably provided with closed in ends, i. e., without vestibules. The passengers are thus obliged to enter and leave the car by means of doorways intermediately of the ends of the vehicles. At all times, whether the vehicles are running on a tangent or rounding a curve, the springs 21 carried by the pins 19, serve to retain the oppositely disposed abutment strips 18 in contact. Hence there is provided suitable barriers across the spaces between the ends of the vehicles at all times when they are connected into a train. On the other hand, whenever the cars of a train are disconnected, the barrier sections have no positive connections which must be released in order to permit the separation of the vehicles.

What I claim is:—

1. The combination with vehicles connected in a train, of extensible barriers arranged in pairs in the space between adjacent ends of and on each side of said vehicles, said barriers being respectively mounted on posts journaled in said vehicles respectively, and means other than said barriers for holding the outer ends of said barriers in abutment with each other.

2. The combination with vehicles connected in a train, of extensible barriers arranged in pairs in the space between adjacent ends of and on each side of said vehicles, said barriers being respectively mounted on posts journaled in said vehicles respectively, and means other than said barriers for holding the outer ends of said barriers in abutment with each other, said barriers being arranged in alinement with the outer side walls of said vehicles.

3. The combination with expansible barriers pivotally mounted on oppositely disposed axes, supports mounted to swing on axes respectively spaced from the first mentioned axes, and yieldable means tending to hold the free ends of said supports together, the free ends of said supports being connected to the free ends of said barriers.

4. The combination with oppositely disposed walls movable relatively to each other, of collapsible barriers carried by said walls respectively, each of said barriers being mounted to swing about one edge, a support pivotally connected to each of said walls at a distance from the barrier carried by that wall, and means tending to swing said support away from the wall, said supports being pivotally connected to the outer edges of said barriers to hold them in abutment.

5. The combination with a vehicle, of a barrier mounted to swing about an axis adjacent to one corner of said vehicle, a support swingingly mounted on a vertical axis adjacent the end of said vehicle and away from the first mentioned axis, said support being connected to said barrier, and means for holding said support in suitable position to hold said barrier in a position projecting from the end of said vehicle.

6. The combination with vehicles connected in train, of extensible barriers arranged in pairs in the space between adjacent ends of and on each side of said vehicles, said barriers being respectively mounted on posts journaled in said vehicles respectively the abutting edges of said barriers being provided with abutment strips and means other than said barriers for movably supporting said abutment strips from the vehicles.

7. The combination with vehicles connected in train, of extensible barriers arranged in pairs in the space between adjacent ends of and on each side of said vehicles, said barriers being respectively mounted on posts journaled in said vehicles respectively the abutting edges of said barriers being provided with abutment strips and means other than said barriers for movably supporting said abutment strips from the vehicles, each of said abutment strips being movably connected to its adjoining barrier.

WILLIAM S. MENDEN.

Witnesses:
Wm. A. Courtland,
Victor J. Chartrand.

Copies of this patent may be obtained for five cents each, by addressing the "Commissioner of Patents, Washington, D. C."